(12) United States Patent
Quintavalla et al.

(10) Patent No.: US 12,442,533 B1
(45) Date of Patent: Oct. 14, 2025

(54) FIRE-TENDING TOOL

(71) Applicants: Leonard Quintavalla, Maiden, NC (US); William Fitzner, Maiden, NC (US)

(72) Inventors: Leonard Quintavalla, Maiden, NC (US); William Fitzner, Maiden, NC (US)

( * ) Notice: Subject to any disclaimer, the term of this patent is extended or adjusted under 35 U.S.C. 154(b) by 877 days.

(21) Appl. No.: 17/700,645

(22) Filed: Mar. 22, 2022

(51) Int. Cl.
*F24B 15/00* (2006.01)

(52) U.S. Cl.
CPC .................. *F24B 15/002* (2013.01)

(58) Field of Classification Search
CPC ........ F24B 15/00; F24B 15/002; F24B 15/10; F24B 1/1915; F23J 1/04; A47J 45/10
See application file for complete search history.

(56) References Cited

U.S. PATENT DOCUMENTS

| | | | |
|---|---|---|---|
| D254,704 S | 4/1980 | Hammond | |
| 4,786,095 A * | 11/1988 | Dumont | A01B 1/06 294/51 |
| 4,889,375 A | 12/1989 | Leu | |
| D311,482 S | 10/1990 | Morton | |
| 5,315,724 A | 5/1994 | Trujilo | |
| 5,603,543 A * | 2/1997 | Ratte | F24B 15/00 294/104 |
| 6,450,557 B1 * | 9/2002 | Martinez | B25G 3/26 294/51 |
| 7,108,304 B2 * | 9/2006 | White | F24B 15/002 294/12 |
| 7,131,675 B1 | 11/2006 | Loucks | |
| 7,344,170 B2 | 3/2008 | Ingram | |
| 8,161,361 B1 | 4/2012 | Biddington | |
| 8,776,909 B2 * | 7/2014 | Johnson | A01B 1/065 172/371 |
| 9,879,863 B1 * | 1/2018 | Lazarov | F24B 15/002 |
| 2005/0110289 A1 | 5/2005 | Myers | |
| 2010/0244474 A1 * | 9/2010 | Kornely | F24B 15/10 294/104 |

FOREIGN PATENT DOCUMENTS

CA 2635194 12/2009

* cited by examiner

*Primary Examiner* — Sang K Kim

(57) ABSTRACT

The fire-tending tool is a tool. The fire-tending tool is adapted for use with a combustion reaction. The fire-tending tool is configured for use in controlling a combustion reaction. The fire-tending tool aligns and arranges the solid phase reactants and solid phase products of the combustion reaction. The fire-tending tool comprises a handle structure, a rake structure, and a poker structure. The rake structure and the poker structure attach to the handle structure.

12 Claims, 2 Drawing Sheets

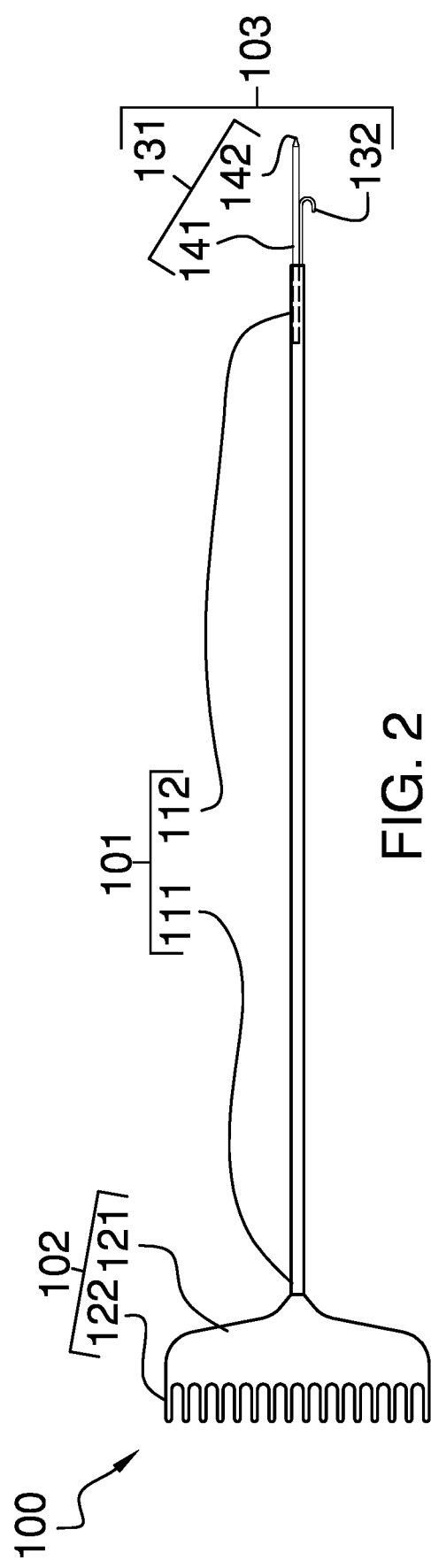
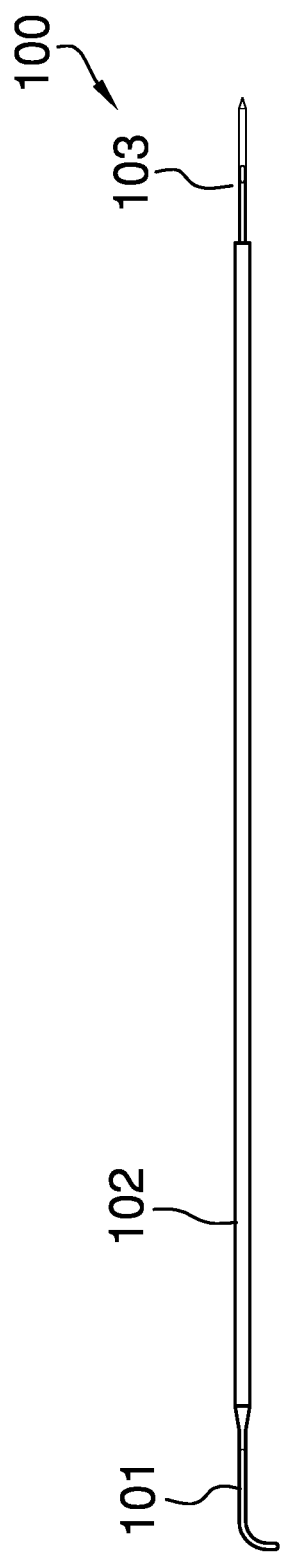
FIG. 2
FIG. 3

FIRE-TENDING TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of implements for use in connection with stoves and ranges. (F24B15/00)

SUMMARY OF INVENTION

The fire-tending tool is a tool. The fire-tending tool is adapted for use with a combustion reaction. The fire-tending tool is configured for use in controlling a combustion reaction. The fire-tending tool aligns and arranges the solid phase reactants and solid phase products of the combustion reaction. The fire-tending tool comprises a handle structure, a rake structure, and a poker structure. The rake structure and the poker structure attach to the handle structure.

These together with additional objects, features and advantages of the fire-tending tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the fire-tending tool in detail, it is to be understood that the fire-tending tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fire-tending tool.

It is therefore important that the claims be regarded as including such equivalent construction insofar as they do not depart from the spirit and scope of the fire-tending tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a top view of an embodiment of the disclosure.

FIG. 3 is a side view of an embodiment of the disclosure.

DETAILED DESCRIPTION OF THE EMBODIMENT

Figure 1:
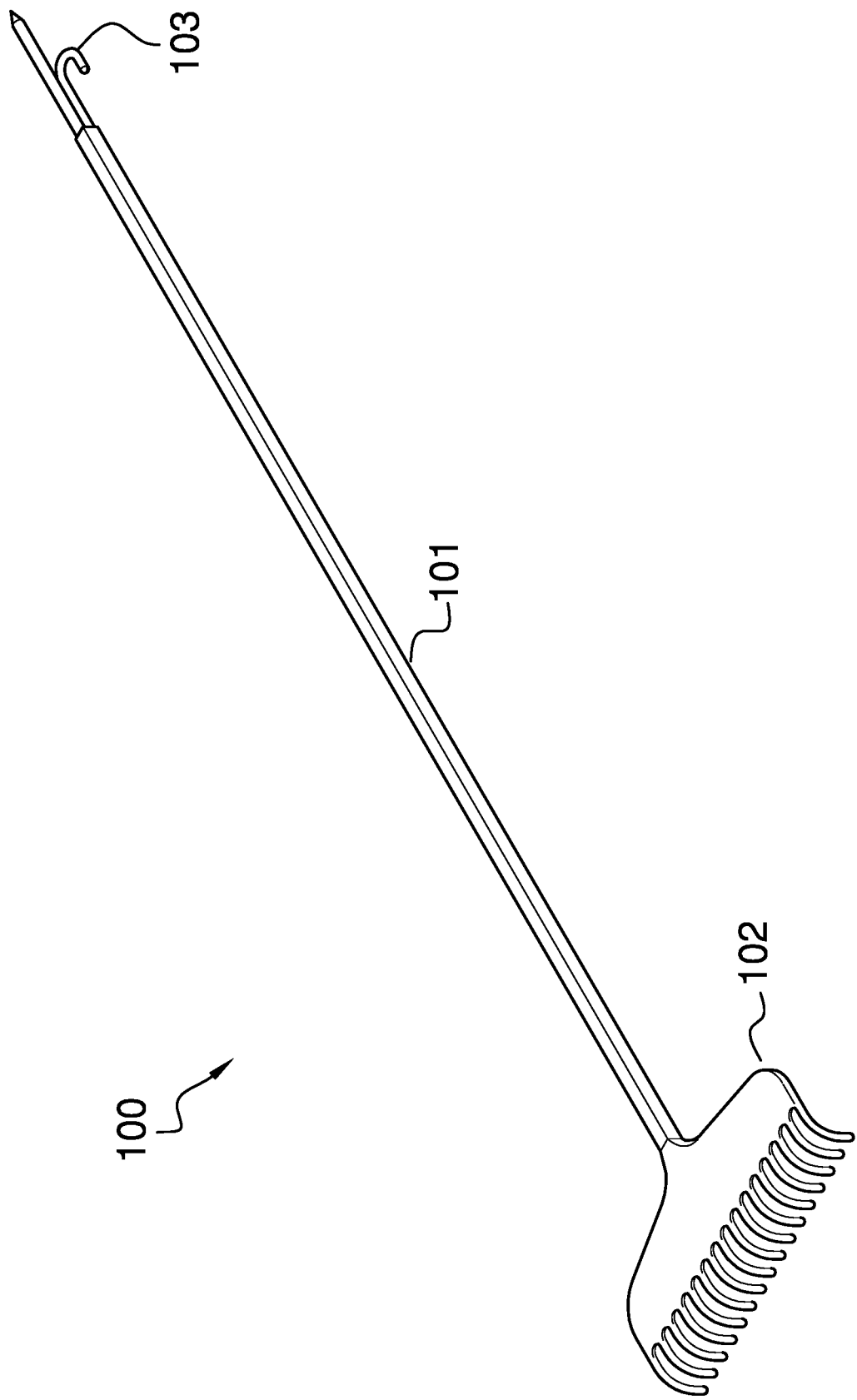
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 3.

The fire-tending tool 100 (hereinafter invention) is a tool. The invention 100 is adapted for use with a combustion reaction. The invention 100 is configured for use in controlling a combustion reaction. The invention 100 aligns and arranges the solid phase reactants and solid phase products of the combustion reaction. The invention 100 comprises a handle structure 101, a rake structure 102, and a poker structure 103. The rake structure 102 and the poker structure 103 attach to the handle structure 101.

The handle structure 101 forms the handle of the tool structure formed by the invention 100. The handle structure 101 is an extension structure. The handle structure 101 extends the reach between the rake structure 102 and the poker structure 103. The handle structure 101 further extends the reach between an individual using the invention 100 and the combustion reaction. The handle structure 101 forms a grip. The handle structure 101 is used to carry and manipulate the invention 100. The handle structure 101 is a fire resistant structure that can be drawn through the solid phase reactants and solid phase products of the combustion reaction while the combustion reaction is in process.

The handle structure 101 comprises a first congruent end 111 and a second congruent end 112. The first congruent end 111 is a congruent end of the prism structure of the handle structure 101. The second congruent end 112 is a congruent end of the prism structure of the handle structure 101. The second congruent end 112 is the congruent end of the handle structure 101 that is distal from the first congruent end 111.

The rake structure 102 forms a working element of the invention 100. The rake structure 102 forms a rake. The rake structure 102 is drawn through the solid phase reactants and solid phase products of the combustion reaction. The rake structure 102 aligns and arranges the bulk solid phases of the reactants and the products of the combustion reaction. The rake structure 102 is a fire resistant structure that can be drawn through the solid phase reactants and solid phase products of the combustion reaction while the combustion reaction is in process. The rake structure 102 mounts on the first congruent end 111 of the handle structure 101.

The rake structure 102 comprises a rake plate 121 and a plurality of teeth 122. The rake plate 121 is a working element of the tool formed by the invention 100. The rake plate 121 is a disk shaped structure. The rake plate 121 attaches the rake structure 102 to the first congruent end 111 of the handle structure 101. The plurality of teeth 122 forms the working element of the rake structure 102. The plurality of teeth 122 forms the comb structure of the rake structure 102. The plurality of teeth 122 physically align and arrange the bulk solid phases of the reactants and the products of the combustion reaction.

The poker structure 103 forms a working element of the invention 100. The poker structure 103 is drawn through the solid phase reactants and solid phase products of the combustion reaction. The poker structure 103 aligns and arranges the solid phase reactants and solid phase products of the combustion reaction. The poker structure 103 is a fire resistant structure that can be drawn through the solid phase reactants and solid phase products of the combustion reaction while the combustion reaction is in process. The poker structure 103 mounts on the second congruent end 112 of the handle structure 101. The poker structure 103 comprises a spit structure 131 and a hook structure 132. The spit structure 131 and the hook structure form working elements of the poker structure 103.

The hook structure 132 is a hook. The hook structure 132 attaches to the lateral face of the prism structure of the shaft structure 141 of the spit structure 131. The hook structure 132 is used to capture and move the larger elements of the solid phase reactants and solid phase products of the combustion reaction.

The spit structure 131 is a composite prism structure. The spit structure 131 has the shape of a spit. The spit structure 131 attaches to the second congruent end 112 of the handle structure 101. The center axis of the composite prism structure of the spit structure 131 aligns with the center axis of the prism structure of the handle structure 101 to form a larger composite prism structure. The spit structure 131 is used to align and arrange the larger elements of the solid phase reactants and solid phase products of the combustion reaction. The spit structure 131 further comprises a shaft structure 141 and an apex structure 142.

The shaft structure 141 is a prism shaped structure. The shaft structure 141 attaches the apex structure 142 and the hook structure 132 to the second congruent end 112 of the handle structure 101. The shaft structure 141 is an extension structure that forms the reach between the second congruent end 112 and the apex structure 142. The shaft structure 141 attaches to the second congruent end 112 to form a composite prism structure with the handle structure 101. The apex structure 142 is a pyramid structure. The base of the pyramid structure of the apex structure 142 attaches to the congruent end of the prism structure of the shaft structure 141 that is distal from the handle structure 101. The apex structure 142 attaches to the shaft structure 141 to form the composite prism structure of the spit structure 131. The apex structure 142 is a sharp structure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Apex: As used in this disclosure, an apex is a vertex that forms an extreme or solitary point of an object.

Brink: As used in this disclosure, a brink refers to the edge or line formed by the intersection of a first plane or surface and a second plane or surface wherein a cant exists between the first plane or surface and the second plane or surface.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chemical: As used in this disclosure, a chemical refers to a substance of a known or fixed composition. The term chemical is used to describe the substance when the details of the composition of the substance or properties of the substance are considered relevant to the disclosure at bar. The term properties is taken to mean both the measurable properties of the substance and the interactions of a first chemical with a second chemical. The term compound refers to: a) a chemical structure that comprises a one or more chemical bonds; or, b) a unified chemical structure formed from mixture of chemicals. The term compound is informally considered a synonym for the term chemical. The term chemistry refers to the study and the use of the knowledge of the composition and properties of chemicals. The terms chemical reaction refers to the interactions between two or more chemical structures. The reactants of a chemical reaction refer to the chemical structures used to initiate the chemical reactants. The products of a chemical reaction refer to the chemical structures that are present at the completion of the chemical reaction.

Comb: As used in this disclosure, a comb is a toothed device that is used for arranging loose objects such as bulk solids. The comb comprises a base structure from which project a plurality of teeth. Each of the plurality of teeth is a rod that projects away from the base structure. The loose objects pass between the diastema between each pair of adjacent teeth selected from the plurality of teeth.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detritus: As used in this disclosure, detritus refers to an accumulation of unwanted material on a surface.

Diastema: As used in this disclosure, a diastema is the space between two teeth.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hook: As used in this disclosure, a hook is an object that is curved or bent at an angle such that items can be hung on or caught by the object.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. The center axis of a pyramid is the line drawn from the vertex where the N faces meet to the center of the N-gon base. The center axis of a right pyramid is perpendicular to the N-gon base. Pyramids can be further formed with circular or elliptical bases which are commonly referred to as a cone or an elliptical pyramid respectively. A pyramid is defined with a base, an apex, and a lateral face. The base is the N-gon shaped base described above. The apex is the vertex that defines the center axis. The lateral face is formed from the N triangular faces described above.

Rake: As used in this disclosure, a rake is a toothed structure used to collect debris from the ground. A rake comprises a comb structure as a working element and a shaft as a handle. The rake is a well-known and documented tool.

Reach: As used in this disclosure, reach refers to a span of distance between any two objects.

Reduction-Oxidation Reaction: As used in this disclosure, a reduction-oxidation reaction (also known as a redox reaction) is a chemical reaction involving the transfer of electrons between the reactants of the reaction.

Shaft: As used in this disclosure, the term shaft is used to describe a rigid prism that is often used as the handle of a tool or implement. The terms inner dimension of the shaft and outer dimension of the shaft are used as they would be used by those skilled in the plumbing arts. The definition of shaft explicitly includes solid shafts or shafts that are formed more like pipes with a hollow passage through the shaft that runs along the center axis of the shaft prism.

Sharp: As used in this disclosure, the term sharp refers to an apex or a brink that is formed in a first structure that is capable of puncturing or cutting a second structure.

Solid: As used in this disclosure, a solid refers to a state (phase) of matter that: 1) has a fixed volume; and, 2) does not flow.

Spit: As used in this disclosure, a spit refers to a composite prism structure formed by the combination of a prism and a pyramid such that the apex of the pyramid forms a point capable of pushing through the surface of a second structure.

Teeth: As used in this disclosure, the teeth refer to a plurality of working elements of a tool that interact with an object in order to cut or align the object. An individual working element selected form the plurality of working elements is called a tooth.

Tool: As used in this disclosure, a tool is a device, an apparatus, or an instrument that is used to carry out an activity, operation, or procedure. A tool generally comprises a working element and a handle.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fire-tending tool comprising
a rake structure, and a poker structure;
wherein the rake structure and the poker structure attach to a handle structure;
wherein the fire-tending tool is adapted for use with a combustion reaction;
wherein the fire-tending tool is configured for use in controlling the combustion reaction;
wherein the fire-tending tool aligns and arranges the solid phase reactants and solid phase products of the combustion reaction;
wherein the handle structure comprises a first congruent end and a second congruent end;
wherein the rake structure forms a working element of the fire-tending tool;
wherein the rake structure forms a rake;
wherein the rake structure is drawn through the solid phase reactants and solid phase products of the combustion reaction;
wherein the rake structure aligns and arranges the bulk solid phases of the reactants and the products of the combustion reaction;
wherein the poker structure forms a working element of the fire-tending tool;
wherein the poker structure is drawn through the solid phase reactants and solid phase products of the combustion reaction;
wherein the poker structure aligns and arranges the solid phase reactants and solid phase products of the combustion reaction;
wherein the poker structure comprises a spit structure and a hook structure;
wherein the spit structure and the hook structure form working elements of the poker structure;
wherein the spit structure further comprises a shaft structure and an apex structure;
wherein the shaft structure attaches the apex structure and the hook structure to the second congruent end of the handle structure;
wherein the shaft structure is an extension structure that forms the reach between the second congruent end and the apex structure.

2. The fire-tending tool according to claim 1 wherein the fire-tending tool is a tool.

3. The fire-tending tool according to claim 2
wherein the handle structure forms the handle of the tool structure formed by the fire-tending tool;
wherein the handle structure is an extension structure;
wherein the handle structure extends the reach between the rake structure and the poker structure.

4. The fire-tending tool according to claim 3
wherein the rake structure is a fire resistant structure that can be drawn through the solid phase reactants and solid phase products of the combustion reaction while the combustion reaction is in process.

5. The fire-tending tool according to claim 4
wherein the poker structure is a fire resistant structure that can be drawn through the solid phase reactants and solid phase products of the combustion reaction while the combustion reaction is in process.

6. The fire-tending tool according to claim 5
wherein the first congruent end is a congruent end of the handle structure;
wherein the second congruent end is a congruent end of the handle structure;
wherein the second congruent end is the congruent end of the handle structure that is distal from the first congruent end.

7. The fire-tending tool according to claim 6
wherein the rake structure mounts on the first congruent end of the handle structure;
wherein the poker structure mounts on the second congruent end of the handle structure.

8. The fire-tending tool according to claim 7
wherein the rake structure comprises a rake plate and a plurality of teeth;
wherein the plurality of teeth attach to the rake plate.

9. The fire-tending tool according to claim 8
wherein the rake plate is a working element of the tool formed by the fire-tending tool;
wherein the rake plate is a disk shaped structure;
wherein the rake plate attaches the rake structure to the first congruent end of the handle structure;
wherein the plurality of teeth forms the working element of the rake structure;
wherein the plurality of teeth forms the comb structure of the rake structure;
wherein the plurality of teeth physically align and arrange the bulk solid phases of the reactants and the products of the combustion reaction.

10. The fire-tending tool according to claim 9 wherein the spit structure is a composite prism structure;
wherein the spit structure has the shape of a spit;
wherein the spit structure attaches to the second congruent end of the handle structure;
wherein the center axis of the composite prism structure of the spit structure aligns with the center axis of the prism structure of the handle structure to form a larger composite prism structure;
wherein the spit structure is used to align and arrange the larger elements of the solid phase reactants and solid phase products of the combustion reaction.

11. The fire-tending tool according to claim 10
wherein the shaft structure is a prism shaped structure;
wherein the shaft structure attaches to the second congruent end to form a composite prism structure with the handle structure;
wherein the apex structure is a pyramid structure;
wherein the base of the pyramid structure of the apex structure attaches to the congruent end of the prism structure of the shaft structure that is distal from the handle structure;
wherein the apex structure attaches to the shaft structure to form the composite prism structure of the spit structure;
wherein the apex structure is a sharp structure.

12. The fire-tending tool according to claim 11
wherein the hook structure is a hook;
wherein the hook structure attaches to the lateral face of the prism structure of the shaft structure of the spit structure.

* * * * *